United States Patent [19]

Onder

[11] 4,087,481
[45] May 2, 1978

[54] AMORPHOUS COPOLYAMIDE FROM ALIPHATIC/AROMATIC DICARBOXYLIC ACID AND ARYLENE DIISOCYANATE MIXTURE

[75] Inventor: Kemal B. Onder, North Haven, Conn.

[73] Assignee: The Upjohn Company, Kalamazoo, Mich.

[21] Appl. No.: 761,429

[22] Filed: Jan. 21, 1977

[51] Int. Cl.$^2$ .................... C08G 18/10; C08G 18/06; C08G 69/32

[52] U.S. Cl. ........................... 260/857 TW; 260/30.2; 260/30.6 R; 260/18 N; 260/30.8 R; 260/30.8 DS; 260/31.2 N; 260/32.6 NA; 260/33.4 R; 260/78 R; 428/474

[58] Field of Search ...................... 260/78 R, 857 TW

[56] References Cited

U.S. PATENT DOCUMENTS 4,018,746  4/1977  Brinkmann et al. ............... 260/78 R

*Primary Examiner*—Harold D. Anderson
*Attorney, Agent, or Firm*—James S. Rose; Denis A. Firth

[57] ABSTRACT

Novel copolyamides having the recurring unit

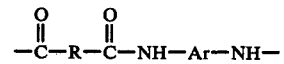

are disclosed wherein, in about 30 percent to about 60 percent of the recurring units, R is $-(CH_2)_x-$ wherein $x$ is an integer from 7 to 12 inclusive, and, in about 40 percent to about 70 percent of the recurring units, R is m-phenylene; Ar in about 70 percent to about 95 percent of the recurring units is 4,4'-methylenebis(phenylene) and in the remaining 5 to 30 percent is a tolylene radical; and provided that when at least about 50 percent of R is m-phenylene Ar is at least 10 percent tolylene and further provided that said tolylene radicals are present in said copolyamide substantially as polyamide blocks with at least said m-phenylene radicals.

The copolyamides are highly amorphous and characterized by high glass transition temperatures. They are easily injection molded with no brittle fracture occurring and yield polymer articles, having high impact and tensile strengths along with excellent elongation and clarity.

15 Claims, No Drawings

AMORPHOUS COPOLYAMIDE FROM ALIPHATIC/AROMATIC DICARBOXYLIC ACID AND ARYLENE DIISOCYANATE MIXTURE

BACKGROUND OF THE INVENTION

1. Field of the Invention

This invention relates to copolyamides and is more particularly concerned with aromatic-aliphatic copolyamides and with processes for their preparation.

2. Description of the Prior Art

The various types of polyamide polymers, and their respective properties in relation to polymer structure and morphology, are well known to those skilled in the art; see, for example, The Encyclopedia of Polymer Science and Technology, Vol. 10, pp. 347–593, 1969, Interscience Publishers, New York, N. Y.

Copending Application Ser. No. 664,764 filed Mar. 8, 1976 discloses improved aromatic-aliphatic copolyamides which combine the properties of ease of injection moldability with high end-use temperature properties and at the same time characterized by high impact strength and high elongation.

The copolyamides prepared in accordance with the present invention have improved amorphous properties over the polyamides of the copending application, and are characterized by higher glass transition temperatures while maintaining the ease of injection moldability, high impact strength, high elongation, and good solvent solubility.

SUMMARY OF THE INVENTION

This invention comprises a copolyamide having the recurring unit:

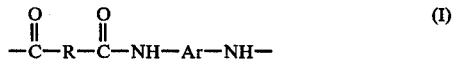

wherein, in about 30 percent to 60 percent of the recurring units, R is —CH$_2$$_x$ wherein $x$ represents an integer from 7 to 12, inclusive, and, in about 40 percent to about 70 percent of the recurring units, R is m-phenylene, and Ar in about 70 percent to about 95 percent of the recurring units is 4,4'-methylenebis(phenylene) and, in the remaining 5 to 30 percent, is a tolylene radical having the formula

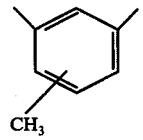

and provided that, when R is at least about 50 percent m-phenylene, Ar is at least 10 percent tolylene, and further provided that said tolylene radicals are present in said copolyamide substantially as polyamide blocks with at least said m-phenylene radicals.

The invention also comprises the process for preparing said copolyamides having the recurring unit (I) set forth above.

DETAILED DESCRIPTION OF THE INVENTION

The injection moldable and solvent soluble copolyamides having the recurring unit (I) defined above are distinguished over the copolyamides set forth in copending Application Ser. No. 664,764 filed Mar. 8, 1976 by the fact that they contain higher proportions of the recurring units wherein R is m-phenylene and Ar is a mixture of tolylene and 4,4'-methylenebis(phenylene) radicals in particular proportions. They (i.e. the polymers of this invention) are further distinguished by the fact that the linear copolyamide chains are more "blocky" in nature than those set forth in said copending application and this feature will be discussed in detail hereinafter. The instant copolyamides are highly amorphous and characterized by a reduced tendency to crystallize. Consequently, they can be extruded without the problems of melt fracture and decomposition. Because of the higher proportion of m-phenylene radicals in relation to the methylene radicals in the polymer chains, they are generally characterized by higher glass transition temperatures but, surprisingly, they retain high impact strength and elongation in spite of the increased proportions of the stiffer m-phenylene radicals. Additionally, the particular proportions of the Ar radical called for by the present invention provide for enhanced polymer solubility, particularly during their preparation, in spite of the high proportions of m-phenylene radicals present.

The particular choice of polymer blocks in conjunction with the particular mixed proportions of the arylene radicals which give rise to the copolyamides of the present invention, which copolyamides are characterized by this unexpected combination of properties, will now be set forth in detail.

The proportion of the recurring units in which R is —CH$_2$)$_x$ is advantageously from about 30 percent to about 60 percent and preferably from about 40 percent to about 50 percent. Correspondingly, the proportion of the recurring units in which R is m-phenylene is advantageously from about 40 percent to about 70 percent and preferably from about 50 percent to about 60 percent. Particularly preferred proportions are those wherein R is —CH$_2$)$_x$ in 50 percent of the recurring units and m-phenylene in the remaining 50 percent and those wherein R is +CH$_2$)$_x$ in 40 percent of the recurring units and m-phenylene in the remaining 60 percent.

The proportion of the recurring units wherein Ar is 4,4'-methylenebis(phenylene) is advantageously from about 70 percent to about 95 percent, and preferably from about 70 percent to about 90 percent. Correspondingly, the proportion of the recurring units wherein Ar is tolylene is advantageously from about 5 percent to about 30 percent and preferably from about 10 percent to about 30.

When R in at least about 50 percent of the recurring units (I) is m-phenylene the radical Ar is at least about 10 percent tolylene.

Furthermore, the recurring units (I) wherein the radical Ar is tolylene are present in the copolyamide substantially as polyamide blocks with at least the m-phenylene radicals and said polyamide blocks having the recurring unit

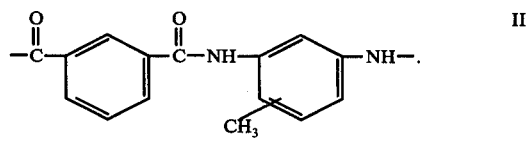

When R in the recurring unit (I) is about 50 percent or less m-phenylene and Ar is greater than about 15 percent tolylene it is preferred to have said tolylene radicals present in the copolyamide as copolyamide blocks in which both the m-phenylene radicals and the $-(CH_2)_x-$ radicals form the blocks having the following random recurring units

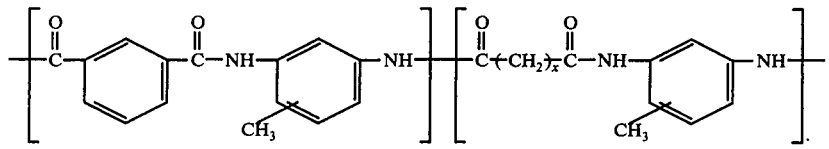

The value of $x$ in the polymethylene unit $-(CH_2)_x$ advantageously is from 7 to 12, inclusive, and preferably is from 7 to 10, inclusive, and most preferably, the value of $x$ is 7.

The copolyamides are characterized by ease of melt processing because of reduced polymer crystallinity. For example, molding, extrusion, and injection molding are possible with the absence of polymer degradation or melt fracture and without an increase in polymer shear modulus.

The copolyamides of the invention are characterized by $M_n$ molecular weights of from about 10,000 to about 50,000 as determined by gel permeation chromatography. They are further characterized by an $\eta$inh at 30° C at 0.5% in m-cresol of at least 0.5.

Unexpectedly, the copolyamides of the invention are characterized by very high impact strengths, much higher than heretofore observed for polyamides possessing such high glass transition temperatures.

Furthermore, the copolyamides possess surprisingly strong tensile strength at yield, and high elongation, notwithstanding their high aromatic content which is normally recognized by those skilled in the art as giving rise to low tensile and elongation value in polyamides.

Also, in spite of the high aromatic content, the copolyamides of the invention are solvent soluble without the use of salts like lithium chloride in those solvents normally employed for polyamides. Illustrative of such solvents are the phenolic solvents such as meta-cresol, cresylic acid, and the like; polar liquids such as linear or cyclic amides or phosphoramides, for example, N,N-dimethylformamide, N,N-dimethylacetamide, N-methylpyrrolidone, tetramethylenesulfone, and the like. This allows the copolyamides of the present invention to be used in those applications calling for solutions such as in the preparation of films, coatings, laminates, and the like.

The term "solvent soluble" means that the copolyamides are soluble to the extent of at least 5.0 percent by weight in said solvents.

The copolyamides are further characterized by showing much lower moisture absorption than polyamides of comparable melt processing characteristics, i.e., a maximum moisture pick-up under equilibrium conditions of about 1.5 to 2.0 percent compared to greater than 6.0 percent for nylon-6,6 under 100% relative humidity.

The copolyamides in accordance with the invention are prepared by a novel process described hereinbelow using methods known to those skilled in the art. For example, a convenient process is the solution technique disclosed in U.S. Pat. No. 3,640,970 wherein the appropriate diacid halides are reacted in solution with the arylene diamines.

A preferred method of preparation is the reaction of the appropriate mixture of diacids (IV) with the appropriate mixture of diisocyanates (V) according to the equation $$HOOC-R-COOH + OCN-Ar-NCO \longrightarrow I + 2CO_2 \uparrow$$
$$\phantom{HOOC-R-COOH + O}IV \phantom{CN-Ar-NC}V$$

wherein R and Ar are defined above, in an inert solvent under anhydrous conditions using essentially equimolar proportions of (IV) to (V) and in the particular sequence of steps set forth hereinafter. Typical general reaction procedures and conditions are described in U.S. Pat. No. 3,642,715 whose disclosure is hereby incorporated by reference.

In the method of preparation of the copolyamides of the present invention the proportion of the diisocyanate (V) wherein Ar is tolylene, that is a tolylene diisocyanate selected from the group consisting of 2,4-toluene diisocyanate, 2,6-toluene diisocyanate, and mixtures thereof, is reacted in a first step with at least the isophthalic acid portion of (IV) so that polyamide blocks having the recurring unit (II) are formed. When the proportion of isophthalic acid employed is about 0.50 mole or less and the proportion of diisocyanate is greater than 0.15 mole of tolylene diisocyanate then it is preferred to polymerize the tolylene diisocyanate in a first step with both the isophthalic acid and the acid (IV) wherein $R = -(CH_2)_x$ so that copolyamide blocks are formed having the recurring randomized units (III).

In the final polymerization step the polyamide blocks (II), or (III), are polymerized with the remaining diacid (IV) and the 4,4'-methylenebis)phenylisocyanate) to form the respective copolyamide (I).

It will be recognized by those skilled in the art that reasonable precautions to exclude moisture should be exercised because of the tendency for isocyanates to react with water. Such precautions include the use of dry solvents, dry apparatus, and carrying out the reaction under an inert atmosphere, i.e., nitrogen. The reactants and conditions will be defined in detail hereinafter.

The acid components (IV) in the proportions called for by the compositions of the present invention are dissolved in a dipolar aprotic solvent and preferably a catalyst added.

The proportion of diacid (IV) is advantageously from about 0.40 mole to about 0.70 mole wherein R is m-phenylene, that is, isophthalic acid, and preferably from about 0.50 mole to about 0.60 mole. Correspondingly, the proportion of diacid (IV) wherein R is $-(CH_2)_x$ is advantageously from about 0.30 mole to about 0.60 mole and preferably from about 0.40 mole to about 0.50 mole.

The proportions of the diisocyanate (V) are advantageously from about 0.70 mole to about 0.95 mole wherein Ar is 4,4'-methylenebis(phenylene), that is, 4,4'-methylenebis(phenylisocyanate) and preferably from about 0.70 mole to about 0.90 mole. Correspondingly, the proportion of diisocyanate (V) wherein Ar is tolylene, that is a tolylene diisocyanate, is advantageously from about 0.05 mole to about 0.30 mole and preferably from about 0.10 mole to about 0.30 mole. When the diacid (IV) is at least about 0.50 mole isophthalic acid then the diisocyanate (V) is at least about 10 percent tolylene diisocyanate.

The tolylene diisocyanate is added first to the acid (IV) while the solution is being heated and stirred. The stirring assists in achieving homogeneity and advantageously aids in the removal of the carbon dioxide formed during the polymerization reaction.

In the next step, the acid (IV) wherein R = —CH$_2$)$_x$ is added, if it was not already reacted in the first stage. This is followed by the addition of the 4,4'-methylenebis(phenylisocyanate).

The process of the present invention including both first and second polymerization steps is advantageously conducted at elevated temperatures from about 125° C to about 225° C and preferably from about 150° C to about 200° C. Higher reaction temperatures can be employed, however, such higher temperatures offer no advantage and insofar as solvent-isocyanate side reaction can occur thereat, their use is not particularly recommended.

The progress of the polymerization reaction is easily monitored by any suitable analytical method known to one skilled in the polymer art. A particularly suitable method is infrared analysis. The characteristic absorptions arising from the isocyanate groups of the organic diisocyanate (4.4μ), the carboxylic acid group (5.85μ), along with the characteristic absorption of the amide group (6.00μ), allow for the facile determination of the progress and completion of the polymerization. The reaction is continued until the diisocyanate and dicarboxylic compound are no longer detectable by infrared absorption analysis.

Illustrative of the solvents used in the present invention are dimethylsulfoxide, diethylsulfoxide, dimethylformamide, diethylformamide, dimethylacetamide, diethylacetamide, tetramethylurea, hexamethylphosphoramide, N-methylpyrrolidone, tetramethylenesulfone, dimethylsulfone, diphenylsulfone, and mixtures thereof. A particularly preferred solvent is tetramethylenesulfone.

The copolyamides can be isolated using standard isolation procedures such as solvent removal by distillation, vacuum stripping, and the like. Alternatively, the copolyamides may be left in solution to be used in an end-use application which calls for a polymer solution. In a preferred embodiment the copolyamides are isolated from the reaction solvent by pouring the solution into a nonsolvent for the polymer such as water, ethyl alcohol, acetone, and the like. The solid polymer strands so obtained are ground up in a mill or chopper and washed with the non-solvents set forth above and then thoroughly dried using standard procedures well known in the art.

Generally speaking, the use of a polymerization catalyst is advantageous and such catalyst is used in a range of about 0.001 percent to about 0.3 percent by weight of total reactants, preferably from about 0.02 percent to about 0.20 percent. A preferred group of catalysts for the polymerization of diisocyanates and dicarboxylic acids are the N-alkali metal lactamates such as potassium propiolactamate, potassium pyrrolidone, sodium caprolactamate, and the like, and the alkali metal alkoxides, such as sodium methoxide, sodium ethoxide, sodium phenoxide, and the like, disclosed in copending applications Ser. No. 521,745 filed Nov. 7, 1974, now U.S. Pat. No. 4,021,412 and Ser. No. 521,744 filed Nov. 7, 1974, now U.S. Pat. No. 4,001,186, respectively.

A most preferred group of catalysts is comprised of the phospholene-1-oxides or 1-sulfides, and the phospholane-1-oxides, or 1-sulfides described in U.S. Pat. Nos. 2,663,737, 2,663,738, and 2,663,739. Particularly preferred members of this group include 1,3-dimethyl-2-phospholene-1-oxide, 1,3-dimethyl-3-phospholene-1-oxide, and mixtures thereof.

Illustrative of the diacids (III) (or the corresponding diacid chlorides thereof) that can be used in the present invention are azelaic acid (azelaoyl chloride), sebacic acid (sebacoyl chloride), undecanedioic acid (undecanedioyl chloride), dodecanedioic acid (dodecanedioyl chloride), brassylic or tridecanedioic acid (tridecanedioyl chloride), and tetradecanedioic acid (tetradecanedioyl chloride).

Optionally, capping agents such as caproic, lauric, myristic, stearic, acids, and the like may be added to the polymerization reactions to ensure removal of any traces of excess isocyanate and to control molecular weight.

Additives such as antioxidants, dyes, fire retardants, and the like may be added to solutions of the polymers of the present invention in solvents of the type set forth above. Alternatively the additives may be added to the dry powdered polymers either prior to or during processing steps such as molding, extruding, injection molding and the like.

The copolyamides prepared in accordance with the present invention can be used as molding powders, for the preparation of fibers and coatings from solution, for injection molding of articles, and the like. The solid polymers so obtained can be used in bushings, seal faces, electric insulators, compressor vanes and impellers, pistons and piston rings, gears, thread guides, cams, brake lining, clutch faces, abrasive articles. Further, coatings of the copolyamides of the present invention are useful in wire coating, in casting films, or spraying polymer films on a variety of substrates such as metal, ceramic, fabrics, polymerics, and the like.

The following examples describe the manner and process of making and using the invention and set forth the best mode contemplated by the inventors of carrying out the invention but are not to be construed as limiting.

EXAMPLE 1

A 2 liter resin flask equipped with a mechanical stirrer, thermometer, reflux condenser, and addition funnel, was charged with 74.76 g. (0.45 mole) of isophthalic acid (IPA) and the glass equipment flamed out under nitrogen to insure a dry, air-free environment. About 650 ml. of tetramethylenesulfone (TMS) was added and the IPA was dissolved during stirring at 185° C for about 1 hour and 25 minutes. A clear colorless solution was formed. A catalyst charge of 0.499 g. (0.15% by wt. of the reactants) of 1,3-dimethyl-3-phospholene-1-oxide was added to the IPA solution using a disposable pipette and the addition funnel was charged with a solution of 15.68 g. (0.09 mole) of 2,4-toluene diisocyanate (TDI) dissolved in 25 ml. of TMS. The TDI was added slowly to the IPA solution over a 1 hour period under nitrogen at 185° C followed by continued stirring of the solution at this temperature for one half hour.

After standing overnight at room temperature (about 20° C) and under nitrogen the contents of the flask had solidified. Heating of the flask was resumed while 85.50 g. (0.45 mole) of azelaic acid and 0.64 g. (0.00225 mole) of stearic acid as a capping agent along with 300 ml. of TMS were added and the addition funnel charged with a solution of 202.74 g. (0.81 mole) of 4,4'-methylenebis(-phenylisocyanate) (MDI) in 125 ml. of TMS. The MDI solution was added slowly to the clear light yellow solution at about 185° C during stirring so that about 80% of the MDI solution was added in 3 hours and the remaining 20% added in 3 hours followed by 100 ml. of rinse TMS and a further 1½ hour period of continued stirring at 185° C.

The golden yellow solution was then poured into approximately 4 gallons of water to precipitate the copolyamide product. There it was washed continuously for 3–4 hours with cold water, ground up in a Waring blender, filtered, and washed overnight by stirring in water, washed overnight again but in acetone, collected by filtration and air dried. Final drying was accomplished at 150° C for 12 hours at about 0.1 mm pressure. The copolyamide thus obtained had an ηinh at 30° C (0.5% in m-cresol) = 0.77 and was characterized by a recurring unit corresponding to the following formula:

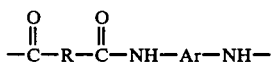

wherein R in about 50 percent of the recurring units is —(CH₂)₇— and in the remaining units is m-phenylene and Ar in about 90 percent of the recurring units is 4,4'-methylenebis(phenylene) and in the remaining units is 2,4-tolylene wherein said 2,4-tolylene radicals are present in polyamide blocks wherein R is m-phenylene and the recurring unit in the block is

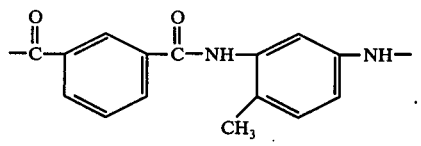

EXAMPLE 2

Using the apparatus described in Example 1 and the ingredients and proportions set forth below there was prepared a copolyamide in accordance with the present invention.

A mixture of 66.45 g. (0.40 mole) of IPA and 75.29 g. (0.40 mole) of azelaic acid was dissolved in 1000 ml. of TMS at 175° C in the resin flask and 27.87 g. (0.16 mole) of 2,4-toluene diisocyanate (TDI) dissolved in 29.2 g. of TMS was added to the addition funnel. A catalyst charge of 0.39 g. (28 drops) (0.15% by wt. of the reactants) of 1,3-dimethyl-3-phospholene-1-oxide was added to the solution of acids. The solution temperature was lowered to 165° C and over a period of 1 hour the TDI solution was added during stirring.

The addition funnel was then charged with a solution of 160.19 g. (0.64 mole) of MDI dissolved in 150.1 g. of TMS. The MDI soluton was added slowly in portions, such that about 195 ml. were added over a 4 hour period and the last 60 ml. over 2 hours and 25 minutes. A 50 ml. rinse of TMS was added upon completion of the MDI addition. As the reaction solution viscosity increased near the end of the addition, stirring speed was increased. An additional period of 20 minutes stirring at the 165° C reaction temperature was carried out.

The hot polymer solution was poured into cold water causing the product to precipitate as thin strands where it was allowed to stand overnight. The strands were soaked for 6 hours in fresh water and then were ground to a powder in a 1 gal. Waring blender. The powder was collected, soaked in acetone for 2 days and stirred rapidly for about 3½ hours in the acetone. The product was collected by filtration, reground in water in the blender, then washed a second time in acetone overnight with stirring. The polymer was collected by filtration and dried at 80°–90° C for 2½ hours. Final drying was accomplished at 150° C for 3 hours at about 0.1 mm. pressure. Thermal gravimetric analysis showed a solvent content weight loss of 0.7%. The copolyamide so obtained had an ηinh at 30° C (0.5% in m-cresol) = 0.85 and was characterized by a recurring unit corresponding to the following formula:

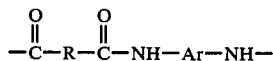

wherein R in about 50 percent of the recurring units is —(CH₂)₇— and in the remaining units is m-phenylene and Ar in about 80 percent of the recurring units is 4,4'-methylenebis(phenylene) and in the remaining units is 2,4-tolylene wherein said 2,4-tolylene radicals are present in copolyamide blocks having the following random recurring units.

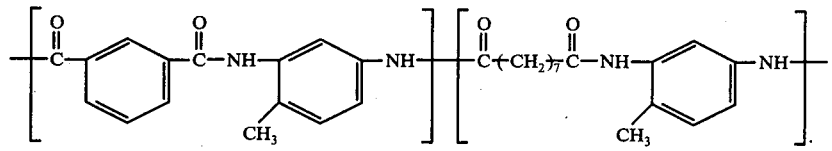

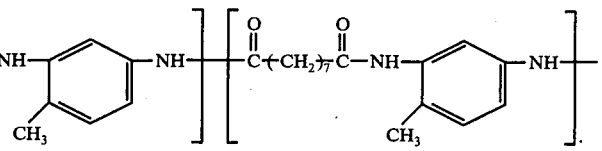

An eight gram sample of the copolyamide was blended with 2 weight percent of Irganox-1098 which is N,N'-bis[3-(3',5'-di-t-butyl-4'-hydroxyphenyl)-propionyl]hexamethylenediamine (an antioxidant supplied by Ciba-Geigy Corp., Ardsley, N.Y.) and molded into a 2 inch diameter disc by first preheating the mold to 209° C, loading it with the sample followed by preheating the mold and the white copolyamide powder for about 5 minutes under contact pressure only from the platens of the heated press to a temperature of 207° C, and then turning off the heat, pressing the mold under 15,000 lbs. of force (approximately 4800 psi) and turning on a cooling fan. The sample was removed from the mold at 126° C to yield a good amber colored disc.

A glass transition temperature (Tg) of 174° C was determined from a plot of the shear modulus versus temperature determined using the procedure of ASTM D 1053-58T on a modified Gehman Torsion Stiffness Tester fitted with a heavy duty furnace to allow operation up to 500° C.

The combined yields of a number of preparative runs similar to the above provided sufficient copolyamide to extrude the polymer into smooth rods using a Brabender Plasti-Corder (Brabender Instruments Inc., South Hackensack, N.J.). The powdered copolyamide was dry-blended with about 2% (by wt.) of Irganox-1098 antioxidant. The extrusion conditions were as follows, screw speed (r.p.m.) = 50; die size = ¼ inch diameter; torque (meters/gm.) = about 2000; temperature conditions: Hopper end, zone 1 = 275° C; zone 2 = 270° C; zone 3 = 270° C; nozzle end, zone 4 = 270° C.

The extruded rods were chopped into pellets and injection molded into both dumbell shaped test pieces having a length = 8½ inch, a gauge width = ½ inch, and overall width = ¾ inch (in accordance with ASTM D638-61T test procedure) and flex bars having a length = 5 inch, a width = ½ inch, and thickness = ¼ inch (in accordance with ASTM D790-63 test procedure). The injection molding machine was an Arburg Model 220E/150 supplied by Polymer Corp., Berlin, Connecticut. The injection molding conditions were as follows, pressure (psi) = 15,700; screw speed (r.p.m.) = 100; injection time = 12 seconds; mold closed time = 35.5 seconds; temperature conditions: Feed, zone 1 = 255° C; zone 2 = 255° C; nozzle, zone 3 = 265° C; mold = 275° F.

The injection molded pieces were characterized by the following physical properties:

| | |
|---|---|
| Tensile strength (psi) | |
| at yield | 14,020 |
| at break | 11,390 |
| Tensile modulus (psi) | 341,300 |
| Elongation, % at break | 10.2 |
| Flexural strength (psi) | 18,950 |
| Flexural modulus (psi) | 362,700 |
| Izod Impact (ft.lbs./in.) (ASTM Test D256-56) | |
| Notched (¼ inches) | 2.25 |
| Unnotched | no break at >20 ft.lbs./in. |
| Heat deflection temp. at 264 psi (ASTM Test D648-56) | 156° C |

EXAMPLE 3

Using the apparatus described in Example 1 and the ingredients and proportions set forth below there was prepared a copolyamide in accordance with the present invention.

The resin flask was charged with 79.74 g. (0.48 mole) of IPA and 800 ml. of TMS and stirred and heated at 170° C for 45 minutes. A catalyst of 0.38 g. (28 drops) (0.15% by wt. of the reactants) of 1,3-dimethyl-3-phospholene-1-oxide was charged to the solution. The addition funnel was charged with 27.87 g. (0.16 mole) of 2,4-toluene diisocyanate dissolved in 50 g. of TMS. At 170° C and over a period of 1 hour the TDI solution was slowly added under constant agitation. Heating and stirring were continued for an additional ½ hour period.

Azelaic acid, [60.23 g. (0.32 mole)] was added to the reaction mixture and the addition funnel was charged with a solution of 160.2 g. (0.64 mole) of 4,4'-methylenebis(phenylisocyanate) (MDI) dissolved in 120 ml. TMS. The MDI solution was added over a period of 5 hours and 20 minutes at 170° C and during constant stirring. Once the MDI addition was complete, 84 g. of rinse TMS was added and heating and stirring were maintained for an additional 40 minute period.

The clear solution was poured slowly into about 4 gal. of cold water which precipitated the polymer. The water was decanted from the polymer strands and replaced with warm water in which they were washed for 4 hours. The polymer was then ground up in a 1 gal. Waring blender, filtered, reground in water, filtered, and washed overnight in about 2 gal. of acetone. The powdered polymer was filtered, washed a second time in acetone for 4 hours, and finally isolated by filtration. It was dried first at 100° C for 2 hours and finally at 170° C for 12 hours under about 0.1 mm. pressure.

A thermogravimetric analysis showed a solvent content weight loss of 0.5% which is within an acceptable range. The copolyamide so prepared had an ηinh at 30° C (0.5% in m-cresol) = 0.83 and was characterized by a recurring unit corresponding to the following formula:

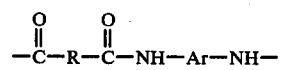

wherein R in about 40 percent of the recurring units is $-(CH_2)_7-$ and in the remaining units is m-phenylene and Ar in about 80 percent of the recurring units is 4,4'-methylenebis(phenylene) and in the remaining units is 2,4-tolylene wherein the tolylene radicals are present in polyamide blocks having the following recurring unit in the block

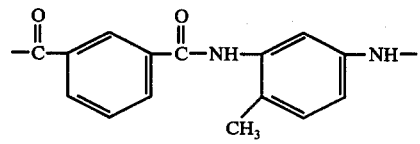

Eight grams of the copolyamide containing 2% by wt. of Irganox-1098 were compression molded into a 2 inch diameter disc at 220° C and 16,000 lbs. force. A Tg = 190° C was determined from a Gehman plot of the shear modulus versus temperature.

Smooth rods of the copolyamide were obtained by extruding a dry blend of the powdered polymer with 2%(by wt.) of Irganox-1098 in a Brabender identified above and using the following extrusion conditions, screw speed (r.p.m.) = 60; die size = 3/16 inch; torque (meters/gm.) = about 3000; temperature conditions: Hopper end, zone 1 = 280° C; zone 2 = 280° C; zone 3 = 280° C; nozzle end, zone 4 = 280° C.

The extruded rods were chopped into pellets and injection molded into both dumbell and flex shaped bars as described above using an Arburg injection molding machine identified above and using the following injection molding conditions, pressure (psi) = 16,240; screw speed (r.p.m.) = 85; injection time = 12 seconds; mold closed time = 35 seconds; temperature conditions: Feed, zone 1 = 270° C; zone 2 = 270° C; nozzle, zone 3 = 270° C; mold = 325° F.

The injection molded pieces were characterized by the following physical properties:

| | |
|---|---|
| Tensile str. (psi) | |
| at yield: | |
| at room temp. (20° C) | 13,510 |
| at <100° C | 8,150 |
| at 140° C | 6,830 |
| at break: | |
| at room temp. (20° C) | 11,650 |
| Tensile modulus (psi) | 323,380 |
| Elongation, % | |
| at yield | 9.2 |
| at break | 13.9 |
| Flexural str. (psi) | 16,790 |
| Flexural modulus (psi) | 332,970 |

| | |
|---|---|
| Izod Impact (ft.lbs./in.) | |
| notched (¼ inches) | 2.64 |
| (⅛ inches) | 3.25 |
| Heat deflection temp. at 264 psi | 160° C |

EXAMPLE 4

Using the procedure and ingredients set forth in Example 1 except that the 1,3-dimethyl-3-phospholene-1-oxide catalyst level was raised to 0.20% by weight of the reactants and the TDI molar proportion was raised from the 10% of Example 1 to 15%, there was obtained a copolyamide in accordance with the present invention which had an ηinh at 30° (0.5% in m-cresol) = 1.02 for the virgin polymer and was characterized by a recurring unit corresponding to the following formula:

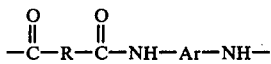

wherein R in about 50 percent of the recurring units is $-(CH_2)_7-$ and in the remaining units is m-phenylene and Ar in about 85 percent of the recurring units is 4,4'-methylenebis(phenylene) and in the remaining units is 2,4-tolylene wherein said 2,4-tolylene radicals are present in polyamide blocks wherein R is m-phenylene and the recurring unit in the block is

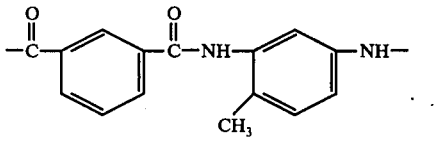

The powdered copolyamide was dry blended with 1% by wt. of Irganox-1098 and extruded into one eighth inch rods using the Brabender extruder and the conditions set forth in Example 2. The rods were chopped and injection molded into the dumbell shaped bars and flex bars described in Example 2 using the Arburg injection molding machine and the conditions set forth therein. The molded bars were characterized by the following physical properties:

| | |
|---|---|
| Tensile str. (psi) at yield: | |
| at room temp. (20° C) | 13,900 |
| at 75° C | 8,850 |
| at 100° C | 7,250 |
| at 125° C | 6,162 |
| at 140° C | 5,410 |
| at break | 11,400 |
| Tensile modulus (psi) | 310,200 |
| Elongaton, % | |
| at yield | 4.5 |
| at break | 25.8 |
| Flexural str. (psi) | 17,250 |
| Flexural modulus (psi) | 346,200 |
| Izod Impact (ft.lbs./in.) | |
| notched (¼ inches) | 2.83 |
| (⅛ inches) | 3.2 |
| Heat deflection temp. at 264 psi | 150° C |

I claim:

1. A solid copolyamide consisting essentially of the recurring unit

wherein, in about 30 percent to about 60 percent of the recurring units, R is $-(CH_2)_x-$ wherein x represents an integer from 7 to 12 inclusive and in about 40 percent to about 70 percent of the recurring units R is m-phenylene, and Ar in about 70 percent to about 95 percent of the recurring units is 4,4'-methylenebis(phenylene) and in the remaining 5 to 30 percent is a tolylene radical having the formula

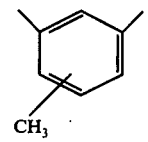

and provided that when R is at least 50 percent m-phenylene Ar is at least 10 percent tolylene and further provided that said tolylene radicals are present in said copolyamide substantially as polyamide blocks with at least said m-phenylene radicals.

2. A copolyamide according to claim 1 wherein R is $-(CH_2)_x-$ in from about 40 percent to about 50 percent of the recurring units and m-phenylene in the remaining 50 percent to 60 percent.

3. A copolyamide according to claim 1 wherein x = 7 to 10 inclusive.

4. A solid copolyamide consisting essentially of the recurring unit

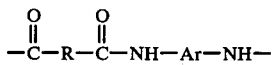

wherein, in about 40 percent to about 50 percent of the recurring units, R is $-(CH_2)_x-$ wherein x represents an integer from 7 to 10 inclusive and in about 50 percent to about 60 percent of the recurring units R is m-phenylene, and Ar in about 70 percent to about 90 percent of the recurring units is 4,4'-methylenebis(phenylene) and in the remaining 10 to 30 percent is a tolylene radical having the formula

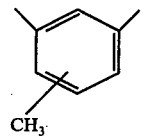

and provided that said tolylene radicals are present in said copolyamide substantially as polyamide blocks with at least said m-phenylene radicals.

5. A copolyamide according to claim 4 wherein R is $-(CH_2)_7-$ in about 50 percent of the recurring units and m-phenylene in the remaining 50 percent and Ar in about 90 percent of the recurring units is 4,4'-methylenebis(phenylene) and in the remaining 10 percent is 2,4-tolylene and said tolylene radicals are present as polyamide blocks with said m-phenylene radicals.

6. A copolyamide according to claim 4 wherein R is $-(CH_2)_7-$ in about 50 percent of the recurring units and m-phenylene in the remaining 50 percent and Ar in about 85 percent of the recurring units is 4,4'- methylenebis(phenylene) and in the remaining 15 percent is 2,4-tolylene and said tolylene radicals are present as polyamide blocks with said m-phenylene radicals.

7. A copolyamide according to claim 4 wherein R is —CH$_2$)$_7$ in about 40 percent of the recurring units and m-phenylene in the remaining 60 percent and Ar in about 80 percent of the recurring units is 4,4'-methylenebis(phenylene) and in the remaining 20 percent is 2,4-tolylene and said tolylene radicals are present as polyamide blocks with said m-phenylene radicals.

8. A copolyamide according to claim 4 wherein R is —CH$_2$)$_7$ in about 50 percent of the recurring units and m-phenylene in the remaining 50 percent and Ar in about 80 percent of the recurring units is 4,4'-methylenebis(phenylene) and in the remaining 20 percent is 2,4-tolylene and said tolylene radicals are present as copolyamide blocks with said m-phenylene radicals and said —CH$_2$)$_7$ radicals.

9. A process for the preparation of a copolyamide as defined in claim 1 said process comprising bringing together under anhydrous conditions and in an inert solvent,
   A. a dicarboxylic acid HOOC-R-COOH comprising a mixture of,
      (i) from about 0.30 mole to about 0.60 mole of a dicarboxylic acid wherein R represents —CH$_2$)$_x$ wherein x represents an integer from 7 to 12 inclusive, and
      (ii) from about 0.40 mole to about 0.70 mole of isophthalic acid; and
   B. a diisocyanate OCN-Ar-NCO comprising a mixture of,
      (i) from about 0.70 mole to about 0.95 mole of 4,4'-methylenebis(phenylisocyanate), and
      (ii) from about 0.05 mole to about 0.30 mole of a tolylene diisocyanate wherein Ar has the formula

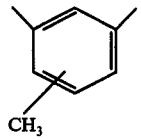

provided that when the dicarboxylic acid (A) is at least 0.50 mole of isophthalic acid, and diisocyanate (B) is at least 0.10 mole of said tolylene diisocyanate and further provided that said tolylene diisocyanate is reacted in a first step with at least said isophthalic acid.

10. A process for the preparation of a copolyamide as defined in claim 4 said process comprising bringing together under anhydrous conditions and in an inert solvent
   A. a dicarboxylic acid HOOC-R-COOH comprising a mixture of,
      (i) from about 0.40 mole to about 0.50 mole of a dicarboxylic acid wherein R is —CH$_2$)$_x$, wherein x represents an integer from 7 to 10 inclusive, and
      (ii) from about 0.50 mole to about 0.60 mole of isophthalic acid; and
   B. a diisocyanate OCN-Ar-NCO comprising a mixture of,
      (i) from about 0.70 mole to about 0.90 mole of 4,4'-methylenebis(phenylisocyanate), and
      (ii) from about 0.10 mole to about 0.30 mole of a tolylene diisocyanate wherein Ar has the formula

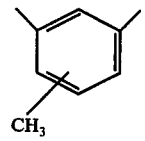

and provided that said tolylene diisocyanate is reacted in a first step with at least said isophthalic acid; and
   C. a catalyst for the reaction of an organic isocyanate with a carboxylic acid.

11. A process according to claim 10 wherein said solvent is tetramethylenesulfone.

12. A process according to claim 11 wherein said catalyst is 1,3-dimethyl-3-phospholene-1-oxide and wherein the dicarboxylic acid (A) comprises about 0.50 mole of azelaic acid and about 0.50 mole of isophthalic acid and the diisocyanate (B) comprises about 0.90 mole of 4,4'-methylenebis(phenylisocyanate) and about 0.10 mole of 2,4-tolylene diisocyanate and provided said 2,4-tolylene diisocyanate is reacted in a first step with said isophthalic acid.

13. A process according to claim 11 wherein said catalyst is 1,3-dimethyl-3-phospholene-1-oxide and wherein (A) comprises about 0.50 mole of azelaic acid and about 0.50 mole of isophthalic acid and (B) comprises about 0.85 mole of 4,4'-methylenebis(phenylisocyanate) and about 0.15 mole of 2,4-tolylene diisocyanate and provided said 2,4-tolylene diisocyanate is reacted in a first step with said isophthalic acid.

14. A process according to claim 11 wherein said catalyst is 1,3-dimethyl-3-phospholene-1-oxide and wherein (A) comprises about 0.40 mole of azelaic acid and about 0.60 mole of isophthalic acid and (B) comprises about 0.80 mole of 4,4'-methylenebis(phenylisocyanate) and about 0.20 mole of 2,4-tolylene diisocyanate and provided said 2,4-tolylene diisocyanate is reacted in a first step with said isophthalic acid.

15. A process according to claim 11 wherein said catalyst is 1,3-dimethyl-3-phospholene-1-oxide and wherein (A) comprises about 0.50 mole of azelaic acid and about 0.50 mole of isophthalic acid and (B) comprises about 0.80 mole of 4,4'-methylenebis(phenylisocyanate) and about 0.20 mole of 2,4-tolylene diisocyanate and provided said 2,4-tolylene diisocyanate is reacted in a first step with said azelaic acid and said isophthalic acid.

* * * * *

UNITED STATES PATENT OFFICE
CERTIFICATE OF CORRECTION

Patent No. 4,087,481  Dated May 2, 1978

Inventor(s) Kemal B. Onder

It is certified that error appears in the above-identified patent and that said Letters Patent are hereby corrected as shown below:

| | |
|---|---|
| Column 1, line 40: | Should read: |
| $—CH_{2_X}$ | $-(CH_2)_{\overline{X}}$ |
| Column 2, line 32: | Should read: |
| $—CH_2)_X$ | $-(CH_2)_{\overline{X}}$ |
| Column 2, line 39: | Should read: |
| $—CH_2)_X$ | $-(CH_2)_{\overline{X}}$ |
| Column 3, line 14: | Should read: |
| $—CH_2)_X$ | $-(CH_2)_{\overline{X}}$ |
| Column 3, line 24: | Should read: |
| $M_n$ | $\overline{M}_n$ |
| Column 4, line 37: | Should read: |
| $—CH_2)_X$ | $-(CH_2)_{\overline{X}}$ |
| Column 4, line 41: | Should read: |
| 4,4'-methylenebis)phenyl-isocyanate) | 4,4'-methylenebis(phenyl-isocyanate) |

UNITED STATES PATENT OFFICE
CERTIFICATE OF CORRECTION

Patent No. 4,087,481      Dated May 2, 1978

Inventor(s) Kemal B. Onder

It is certified that error appears in the above-identified patent and that said Letters Patent are hereby corrected as shown below:

Column 5, line 11:          Should read:

$-CH_2)_x$                  $-(CH_2)_{\overline{x}}$

Column 6, line 19:          Should read:

stearic, acids,             stearic acids,

Column 10, line 61:         Should read:

at room temp.(20°C          at room temp.(20°C)

Column 11, line 25:         Should read:

$-(Ch_2)_{\overline{7}}$    $-(CH_2)_{\overline{7}}$

Column 13, Claim 7, line 5: Should read:

$-CH_2)_7$                  $-(CH_2)_{\overline{7}}$

Column 13, Claim 8, line 12: Should read:

$-CH_2)_7$                  $-(CH_2)_{\overline{7}}$

Column 13, Claim 8, line 18: Should read:

$-CH_2)_7$                  $-(CH_2)_{\overline{7}}$

UNITED STATES PATENT OFFICE
CERTIFICATE OF CORRECTION

Patent No. 4,087,481      Dated May 2, 1978

Inventor(s) Kemal B. Onder

It is certified that error appears in the above-identified patent and that said Letters Patent are hereby corrected as shown below:

Column 13, Claim 9, line 27:    Should read:

$-CH_2)_x$                        $-(CH_2)_x$

Column 13, Claim 10, line 60:    Should read:

$-CH_2)_x,$                     $-(CH_2)_x$

Signed and Sealed this

Twenty-fourth Day of October 1978

[SEAL]

Attest:

RUTH C. MASON
*Attesting Officer*

DONALD W. BANNER
*Commissioner of Patents and Trademarks*